B. HERSHEY & R. DUDLEY.
Improvement in Springs for Vehicles.
No. 5,035. Reissued Aug. 20, 1872.
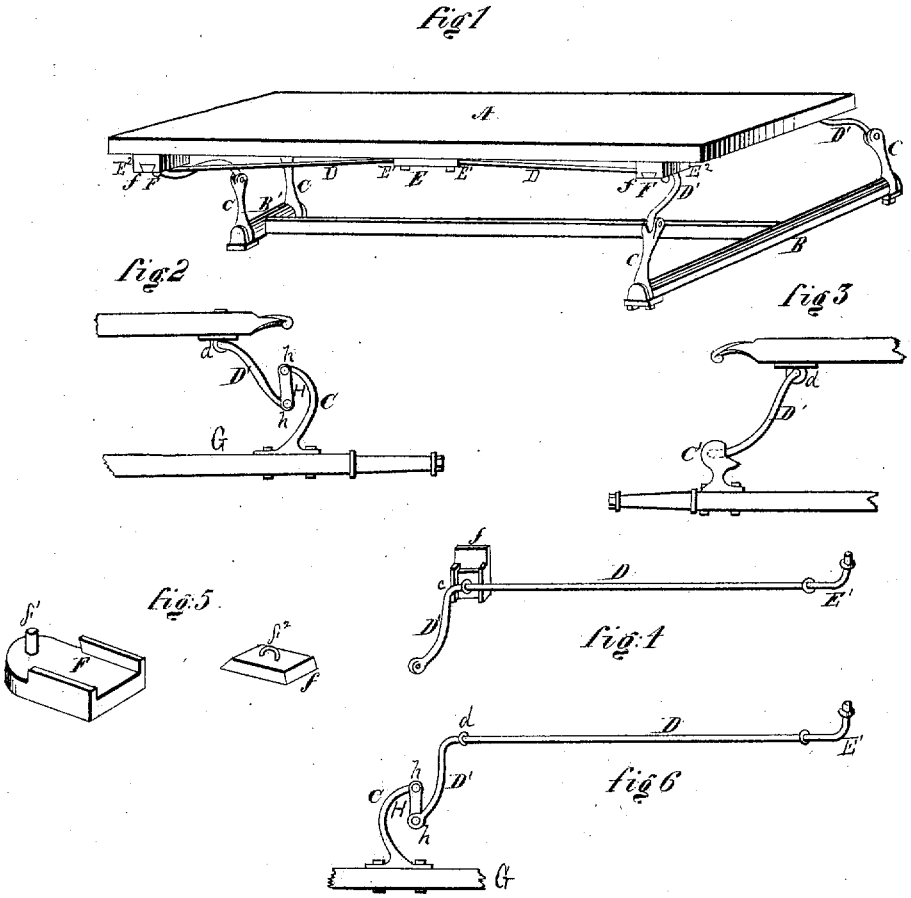
Witnesses:
Edwin James
R. V. Gordon.
Inventors:
Benjamin Hershey
and Richard Dudley
per J. P. Holmead
Attorney.
AM. PHOTO-LITHOGRAPHIC CO. N.Y. (OSBORNE'S PROCESS.)

UNITED STATES PATENT OFFICE.

BENJAMIN HERSHEY AND RICHARD DUDLEY, OF ERIE, PENNSYLVANIA, ASSIGNORS, BY MESNE ASSIGNMENTS, TO RICHARD DUDLEY AND RICHARD F. GAGGIN.

IMPROVEMENT IN SPRINGS FOR VEHICLES.

Specification forming part of Letters Patent No. 112,037, dated February 21, 1871; reissue No. 5,035, dated August 20, 1872.

*To all whom it may concern:*

Be it known that BENJAMIN HERSHEY and RICHARD DUDLEY, both of the city and county of Erie, and State of Pennsylvania, invented certain new and useful Improvements in Springs for Vehicles, on which Letters Patent of the United States were granted bearing date February 21, 1871, and numbered 112,037; that RICHARD DUDLEY and RICHARD F. GAGGIN are the owners by assignment of the entire interest in said Letters Patent; and that the following is a full, clear, and exact description of said invention, reference being had to the accompanying drawing and the letters of reference marked thereon making part of this specification, in which—

Figure 1 is a perspective view, showing the improved spring as applied to a vehicle. Fig. 2 is a side view of the spring when a link is used to connect the lateral lever-arm and the standard. Fig. 3 is a side view of the spring when a shoe is used to receive one end of the lateral lever-arm. Fig. 4 is the spring-rod and friction-plate detached from the vehicle. Fig. 5 is an enlarged view of the friction-slide and its cup or flanged seat. Fig. 6 is the spring-rod and connecting-link detached from the vehicle.

The object of our invention is to furnish for wagons and other vehicles a torsion spring that shall be cheap and simple in construction, and, comparatively speaking, frictionless in operation.

It is well understood in all that class of springs known as the torsion, that the spring acts or its elasticity is developed through the twisting or wrenching of the rod, bar, or other material out of which the same is constructed. Consequently, to secure the proper working of the spring it is essential that one of its bearings should be firmly and rigidly secured to the bolster or other bed-piece, and its other bearing to which the lateral lever arm is attached should be so arranged as to allow of a partial revolution or a vibratory movement at that point, and which secures the proper twisting of the rod to develope its torsional action.

The present invention consists in constructing each spring of two independent rods or bars, the inner ends of which are firmly and rigidly keyed and held by bearings, one on each side of the wagon-bed or bolster, their other or movable bearings being at the opposite ends of said bed or bolster.

The present improvement is rendered comparatively frictionless in operation by using in connection with the spring either of the three several devices which are illustrated in the accompanying drawing—that is to say, we may employ in connection with the spring and standard, either a sliding plate, as shown in Figs. 1, 4, and 5; the link, as shown in Figs. 2 and 6; or, the shoe, as shown in Fig. 3. When the transverse sliding plate is used, it is secured to the main shank of the spring at or near the elbow formed by the lateral lever-arm. These plates work in cup or flanged seats secured at the corners of the bolster or other bearing. Instead of this sliding plate an ordinary staple or any other equivalent device may be used to secure the spring at its movable bearing, care being taken that the attachment shall be such as to allow of the turning of the rod therein, as the torsional action of the spring is being developed, and in which case the lateral lever-arms of the different springs are secured to their respective bearings or supports by means of shackle-bars or links, and which, when pressure is applied to the springs, permits of the lateral lever-arms receding without friction toward the bolster, which causes the torsional action of the spring; or, the link may also be dispensed with, and, if desired, the free ends of the lateral lever-arms introduced into a shoe or socket-bearing at the head of the standard or support. Thus it will be seen that the springs are acted on by a direct vertical pressure, and are so arranged as to readily yield and without friction, accommodate themselves to the pressure, twisting the rods and developing the torsional action of the spring to the degree desired. As the pressure is lessened, the springs return to their normal condition.

The construction and operation of my invention are as follows: A is a platform, bolster, or bed-piece, to which the springs D D are attached. B is the bed-piece that rests on the rear axle, and B′ the ordinary head-block of a wagon. D D are the springs, which are constructed out of properly-tempered steel.

These springs are usually of the form shown in Fig. 1, and are to be of such dimensions that the two rods which compose each spring shall, when secured on the bed-piece A, extend nearly the entire length of the same, as clearly shown in said figure, or each rod may extend nearly that distance. These rods are rigidly secured at their sections $E^1$ $E^1$ to the under surface of the bed-piece A. It is positively essential to the effective working of the spring that, at this point, or their inner bearings, the springs should be so keyed as to deny all movement or play to the same. At their other ends, in order to secure the necessary twisting or wrenching of the rod to develope the elasticity of the spring, it is necessary that the springs should have, at $E^2$, a sliding bearing, as in Fig. 1, or so held by a staple, *d*, or an equivalent device, as shown in Figs. 2 and 3, as to allow of the necessary revolution or turn of the spring when wrenched by the lever-arms D′ D′, so as so insure their proper torsional action. In Fig. 1, the lever-arms D′ D′ are pivoted to standards C C, which are clipped or clamped and keyed over the bed piece B and head-block B′ of the wagon. F F are cup or flanged seats, in which the sliding plates *f f* work. The flanged walls of the cup-seats F F are inclined, as shown in Fig. 5, as are also the sides of the sliding plates *f f*. The advantage of this arrangement is that, while it allows of a free transverse movement to the slide, it prevents its falling out of its seat or otherwise becoming detached therefrom. These seats or cups F F are secured on the under surface of the bed-piece A, and at such relative position to the fixed center bearing E of the bolsters that the small staple $f^2$ on the slide *f* shall encircle the main shank or torsion-arm of the springs D D at or near the elbow *c*, which is formed by the lateral lever-arm D′ being turned off at right angles.

The operation of this anti-friction cup F and slide *f*, which is clearly illustrated in Figs. 1, 4, and 5, will be readily understood. The spring is attached to the vehicle and is in position, as shown in Fig. 1. Weight is placed or pressure is applied on the platform or bed piece A, and is, owing to the connection between the lateral arms D′ D′ and standards C C, received and supported on a vertical line. This, through the arms D′ D′, twists or wrenches the rods D D, causing them to make a partial revolution, which it is readily enabled to do by the yielding or traveling, in an outward direction, of the sliding friction-plate *f*. So soon, however, as the pressure which has caused this movement of the plate *f* ceases or is removed, the natural elasticity of the metal untwists the spring, and the plate *f* is returned, the check-pin or stump $f^1$ preventing it being carried beyond a given point. In Figs. 2 and 6 there is also illustrated a device that is not only exceedingly simple in construction but effective in operation, and most admirably adapted for certain classes of vehicles. The springs D are made and rigidly secured at their sections $E^1$ to the bed piece A by a bearing-plate, E, precisely as in Fig. 1, but the cup F and sliding plate *f* are dispensed with, and the springs are held at their outer sections by staples *d d*, the lateral lever-arms D′ D′ being connected to the brackets and standards C C by means of the links or shackle-bars H H. These links are so pivoted to the lever-arms of the spring and the brackets C C as to leave hinged-joint connections at *h h*. Consequently, when pressure is applied to the springs, owing to the hinged-joint connections at *h h*, the springs readily yield, the arms D′ D′ wrenching or twisting the same, and developing thereby, their elasticity. Owing to this arrangement of link H, and its connection with spring and bracket, such a yielding play is allowed to the spring as to cause it to operate without friction. The standards or brackets C C may be secured as shown in Fig. 1, or, if desired, bolted directly to the axle G. In Fig. 3 another device is shown, one in which not only the sliding plate *f* and cup F are dispensed with, but also the link H. The springs are secured precisely as in Fig. 2, but the supports and brackets are essentially different, being provided with a shoe or socket-head C′. Into this socket-head the lateral lever-arms enter and work.

What we claim as new, and desire to secure by Letters Patent of the United States, is—

1. Torsion springs, constructed of two rods, one at each side of the bed or bolster, the inner ends of which are firmly and rigidly held by bearings E, and with their outer ends so secured as to allow of the necessary revolution or vibratory movement of the rods to develope their torsional action, as and for the purpose specified.

2. The lateral lever-arms D′ D′ of the torsion spring, and the brackets or standards C C, when the same are so connected by links H H as to operate substantially as described.

3. The sliding-plates *f f* and cup-seats F F, so secured in connection with a torsion-spring rod, as to operate as described.

4. The rod D, when the same is secured in a transversely-sliding plate, so as to allow of the necessary revolution of the rod to form a torsion spring, substantially as described.

5. The rods D D, having lateral arms D′ D′, friction-plates *f f*, and standards C C, when the same are combined and arranged so as to operate substantially as described.

In testimony whereof we have signed our names to this specification before two subscribing witnesses.

B. HERSHEY. [L. S.]
RICHARD DUDLEY. [L. S.]

Witnesses:
JACOB F. WALTHER.
JAMES S. HALL.